United States Patent [19]  
Furchak

[11] Patent Number: 4,601,485  
[45] Date of Patent: Jul. 22, 1986

[54] MECHANISM AND COUPLING PROCESS FOR LIFTING THE TAILGATE OF A PICK-UP TRUCK WHEN COUPLING WITH FIFTH WHEEL VEHICLES

[76] Inventor: John G. Furchak, P.O. Box 2138, Novato, Calif. 94948

[21] Appl. No.: 726,678

[22] Filed: Apr. 24, 1985

[51] Int. Cl.⁴ ............................................. B62D 53/00
[52] U.S. Cl. .............................. 280/423 R; 296/57 R
[58] Field of Search .............. 280/423 R, 423 B, 424, 280/432; 296/57 R, 57 A; 414/557; 298/20 A, 22 AE

[56] References Cited  
U.S. PATENT DOCUMENTS

| | | | |
|---|---|---|---|
| 2,151,335 | 3/1939 | Rush | 296/57 A |
| 2,328,082 | 8/1943 | Lawrence | 296/57 R |
| 2,783,080 | 2/1957 | Ringsby | 280/423 R |
| 2,850,187 | 9/1958 | Roberts | 414/557 |
| 3,900,118 | 8/1975 | Kellog | 414/530 |
| 3,978,996 | 1/1975 | Oltrogge | 414/325 |
| 4,120,513 | 10/1978 | Hurt | 280/423 B |

Primary Examiner—John J. Love  
Assistant Examiner—Mark C. Dukes  
Attorney, Agent, or Firm—Norman E. Reitz

[57] ABSTRACT

A mechanism and process for lifting the tailgate of a pick-up truck when the truck is being coupled to a fifth wheel vehicle. The mechanism comprises a cable that connects with the tailgate, passes over pulleys on the side of the truck, spans the open bed of the truck and passes over pulleys on the other side of the truck. As the truck is backed underneath the forward section of the fifth wheel vehicle, the pin box which depends from the forward section engages the cable where it spans the open bed of the truck. As the pin moves toward engagement in the fifth wheel mount on the bed of the truck, the cable gradually rotates the tailgate from the open to the closed position. In decoupling the process is reversed.

7 Claims, 6 Drawing Figures

MECHANISM AND COUPLING PROCESS FOR LIFTING THE TAILGATE OF A PICK-UP TRUCK WHEN COUPLING WITH FIFTH WHEEL VEHICLES

This invention relates to a mechanism for lifting or lowering the tailgate of a pick-up truck and, more particularly, relates to a mechanism for lifting or lowering the tailgate of a truck when the truck is being coupled with or decoupled from a Fifth Wheel Vehicle.

Fifth Wheel Vehicles are a particular type of trailer which has no motor and is intended to be towed by a truck having a special mounting mechanism attached to a flat bed. Fifth Wheel Vehicles typically have an even number of wheels (2, 4 or 6) and a forward section which extends ahead of the main body of the vehicle but does not reach down to the level of the main body. Underneath the forward section, a pin box is appended. When the Fifth Wheel Vehicle is to be moved, the pin which depends from the box is coupled into the mounting mechanism, typically a swivel mechanism, which is attached to the back of the towing truck. After the Fifth Wheel Vehicle is coupled with the specially fitted truck, it is towed much as a typical trailer. At the site to which the Fifth Wheel Vehicle is moved, the truck is uncoupled and the trailer stands by itself. The advantages of Fifth Wheel Vehicles over standard trailers are that they are easier to tow and possess more usable interior space for a given length. As a result of the need to couple the pin and pin box with a special mount on the back of a truck, it is necessary first to have such a specially fitted truck and, second, to be knowledgeable in the coupling procedure. Since most trucks, and particularly pick-up trucks, have a tailgate which would interfere with coupling, it is necessary that the tailgate be lowered during the coupling sequence. Once the pin box clears the tailgate, it is desirable that the tailgate be raised. Thus, in carrying out the coupling procedure, two individuals are usually required. The first person backs the pick-up truck towards the Fifth Wheel Vehicle; the second person first opens the tailgate and then stands by it to raise it once the pin passes the position of the tailgate. Alternatively, a single person may first open the tailgate and then back the truck up to an intermediate position at which the pin clears the tailgate. The person then stops the pick-up truck, leaves the cab, lifts the tailgate to a vertical, closed position, and finally returns to the cab to complete the backing up procedure to the point where the pin engages in the mounting mechanism, the so-called Fifth Wheel, which is mounted in the pick-up truck bed. With either coupling procedure, human hands are utilized to lift the tailgate in proximity to a heavy Fifth Wheel Vehicle body and in the presence of a moving truck. Accidents are possible, the procedure is cumbersome, and two persons are not always available.

It is therefore an object of the present invention to provide a mechanism for automatically lifting the tailgate of a truck as a Fifth Wheel Vehicle is being coupled to a mount on the truck bed.

It is a further object of the present invention to provide a mechanism for automatically lowering the tailgate of a truck as a Fifth Wheel Vehicle is being decoupled from a mount on the truck bed.

It is an additional object of the present invention to provide a process for coupling and decoupling a Fifth Wheel Vehicle with a towing truck without requiring more than a single operator.

It is yet another object of the present invention to provide a sequence of steps for coupling a Fifth Wheel Vehicle to a truck without exposing the driver to injury.

SUMMARY OF THE INVENTION

A mechanism is provided for lifting the tailgate of a pick-up truck when the truck is being coupled to a Fifth Wheel Vehicle. The mechansim comprises a cable and an arrangement of pulleys which opens and closes the tailgate as the pin box contacts a section of the cable. The cable connects with one side of the tailgate, passes over pulleys on the same side of the truck, crosses over the bed of the truck, passes over pulleys on the other side of the truck, and then contacts the other side of the tailgate. For coupling, the tailgate is initially disposed in its open, horizontal position. As the truck backs up towards the Fifth Wheel Vehicle, the pin box on the Fifth Wheel Vehicle contacts a section of the cable. As the truck and Fifth Wheel Vehicle are moved closer and closer together, the pin box pushes the cable in the direction of the cab of the truck. As a consequence, the cable draws the tailgate of the towing vehicle gradually upwards. By the time the pin engages the Fifth Wheel mounted in the pick-up beds, the tailgate has moved to a near vertical position. For decoupling, the procedure is reversed.

BRIEF DESCRIPTION OF THE DRAWINGS

For a more complete understanding of the mechanism and the coupling process of the present invention, reference may be had to the accompanying drawings which are incorporated herein by reference and in which:

FIGS. 3-6 are a sequence of side views illustrating the coupling process wherein a truck backs up towards and couples with a Fifth Wheel Vehicle in which:

FIG. 3 shows the relative position of the Fifth Wheel Vehicle and truck as the pin on the Fifth Wheel Vehicle crosses the position that the tailgate occupies when it is closed;

FIG. 4 shows the relative position of the Fifth Wheel Vehicle and truck as the truck body approaches the position where the tailgate in its open position would contact the main body of the Fifth Wheel Vehicle;

FIG. 5 shows the relative position of the Fifth Wheel Vehicle and the truck as the pin box has engaged the cable and drawn the tailgate to a partially upright position; and FIG. 6 shows the towing position of the Fifth Wheel Vehicle at which the pin is engaged in the Fifth Wheel mounted in the pick-up truck bed.

DESCRIPTION OF THE PREFERRED EMBODIMENT

Fifth Wheel Vehicles are becoming popular types of vehicles because they are easier to tow and have more usable interior space for a given length than conventional trailers. For towing, these vehicles require that special mounting attachments be placed on the back of trucks, typically on the beds of pick-up trucks. In order to couple the pick-up trucks to the Fifth Wheel Vehicles when the vehicles are to be moved, it has been necessary for two individuals to carry out the coupling and decoupling procedure or for the driver to move from the cab of his vehicle to the rear of the bed in order to close the tailgate as the truck moves close to the main body of the Fifth Wheel Vehicle. The mechanism and procedure of the present invention allows a single operator to complete the coupling or decoupling procedure without requiring a person to stand by the tailgate as the Fifth Wheel Vehicle and truck are brought together or separated.

Figure 1:
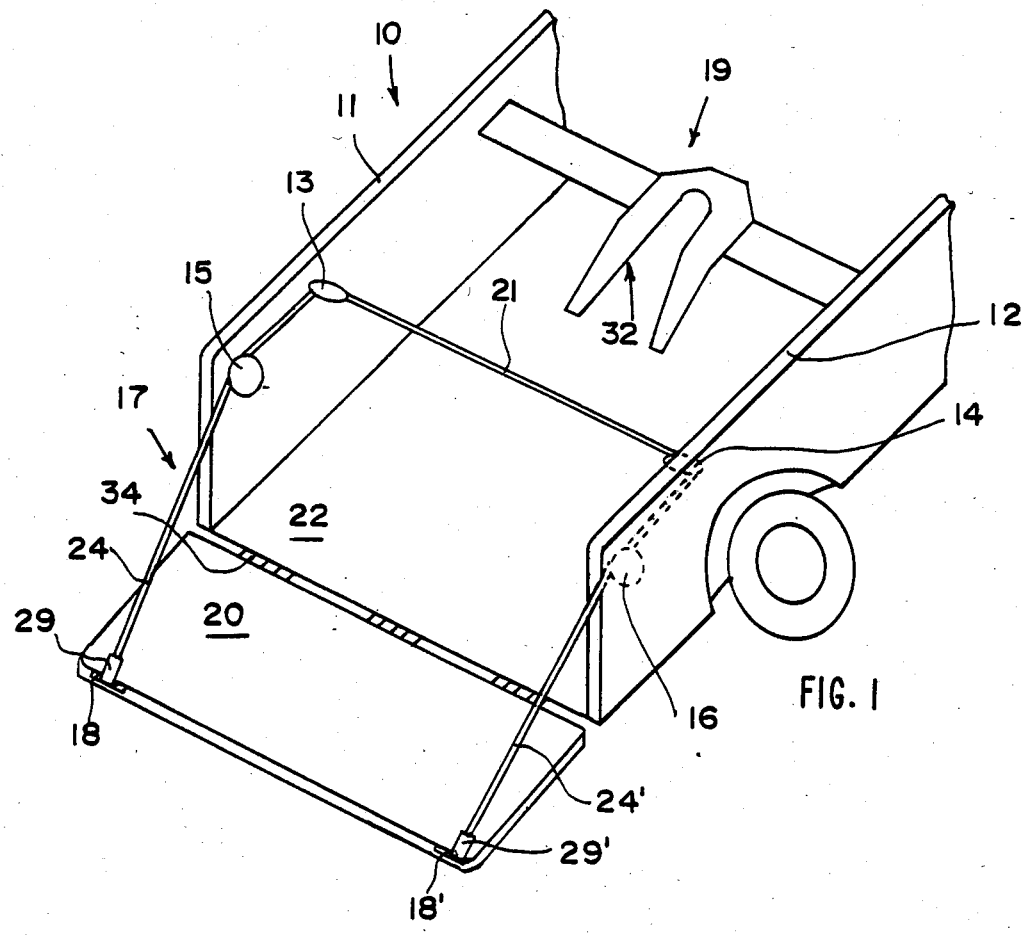
FIG. 1 is a perspective view of the mechanism of the present invention as mounted on the bed of a pick-up truck.
Figure 2:
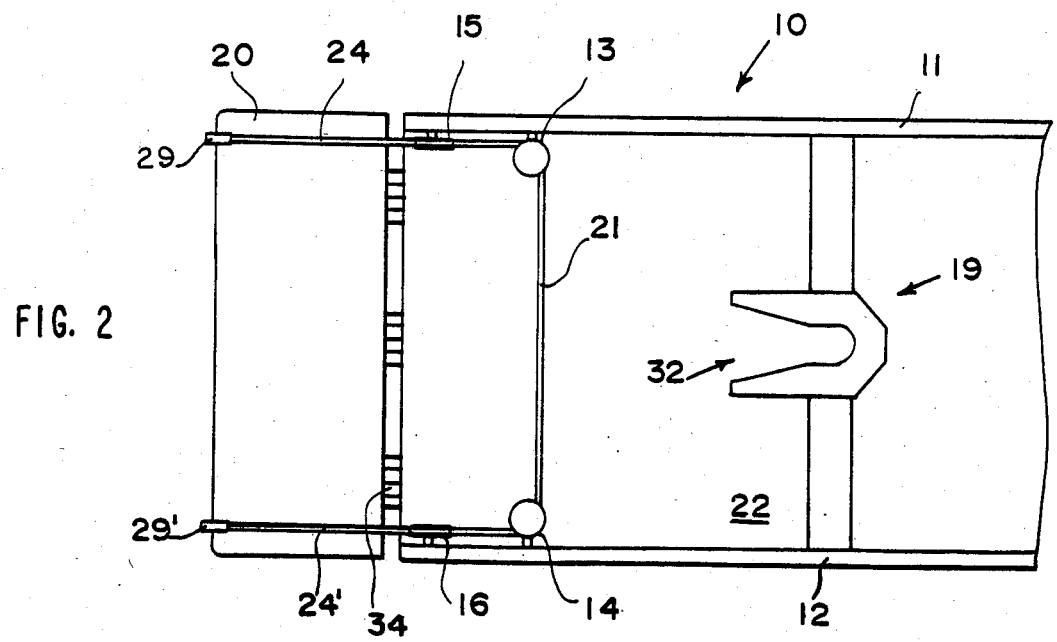
FIG. 2 is a plan view of the mechanism of FIG. 1.

As seen in FIG. 1, a pair of pulleys 13 and 14 are affixed to the opposing sides 11 and 12, respectively, of the pick-up truck 10 so that section 21 of cable 17 may stretch across the two pulleys and across the open bed 22. Pulleys 13 and 14 are shown to be oriented parallel to the bed 22 of the truck 10. The cable 17 is strung between the cable anchor hole 18 on one side of tailgate 20, over pulley 15, around pulley 13, over the open bed 22, around pulley 14, over optional pulley 16, and onto the other cable anchor hole 18' of tailgate 20. The cable 17 is of a length such that the tailgate 20 is in a horizontal position when the section 21 is stretched taut across the open bed 22. The optional pulleys 15 and 16 on the sides 11 and 12, respectively, of the truck 10 are oriented parallel to the walls 11 and 12. They serve to stabilize the cable 17 so that the pin box of the Fifth Wheel Vehicle may make positive contact with the section 21 as coupling or decoupling is carried out. The cable and arrangement of pulleys, shown in perspective view in FIG. 1, is shown in plan view in FIG. 2. Here, the stability in both the lateral direction between the walls and the vertical direction above the bed is evident due to the complementary orientations of the pairs of pulleys 13, 14 and 15, 16. The pulleys 13, 14 provide stability principally in the lateral direction; the pulleys 15, 16 provide stability principally in the vertical direction.

Figure 4:
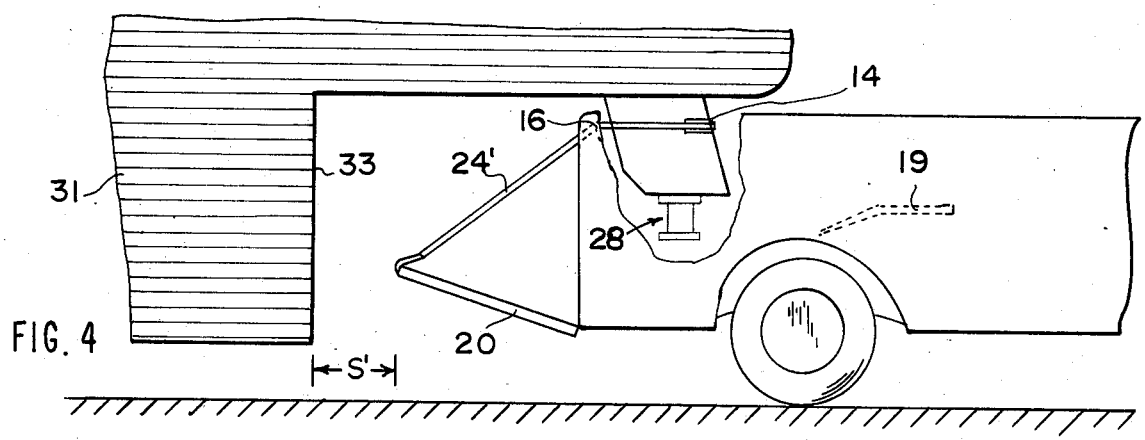
Figure 5:
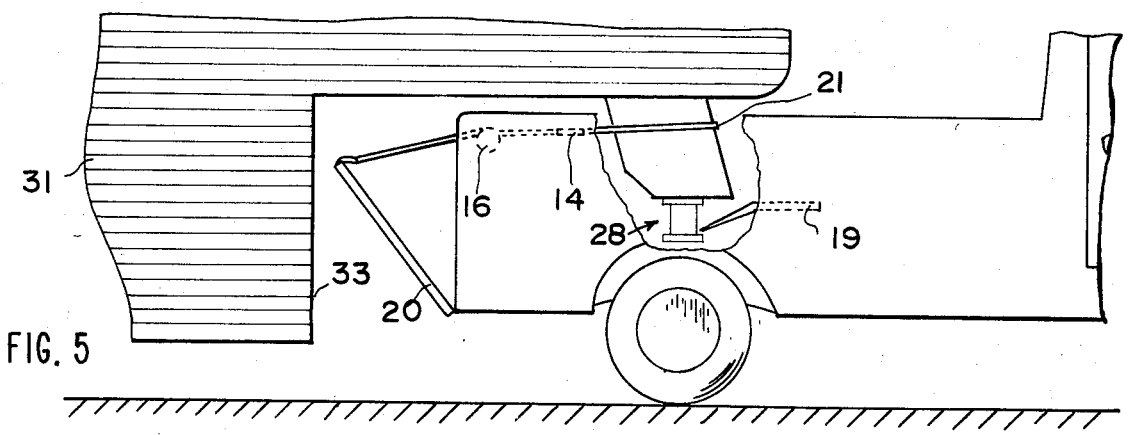
Figure 6:
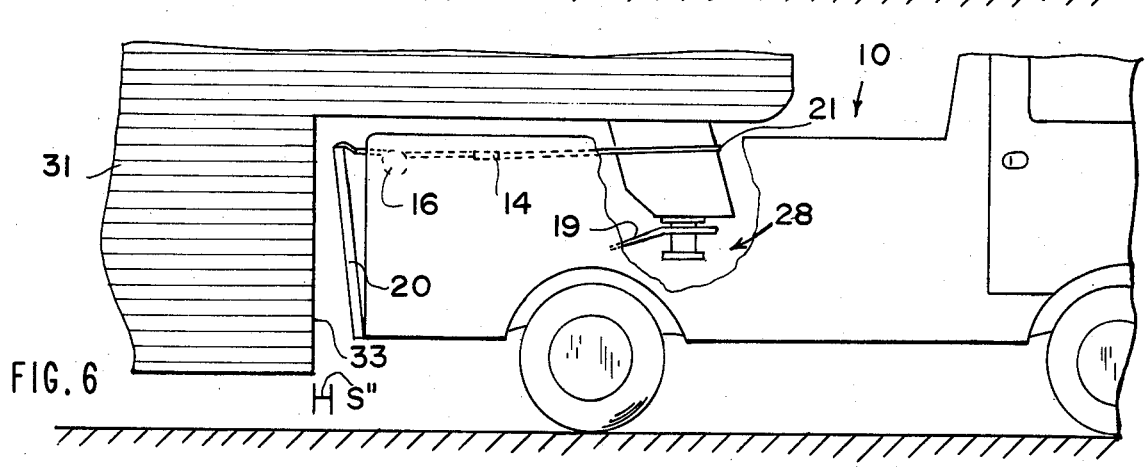

In the coupling process, shown in FIGS. 3-6, the contact of the section 21 with the pin box 27 on the Fifth Wheel Vehicle 25 pushes the cable in towards the cab of the truck 10 until the Fifth Wheel Vehicle pin engages the "Fifth Wheel" on the pick-up truck bed, as shown particularly in FIG. 6. As the cable is pushed forward, the section 24 which extends between pulley 15 and cable anchor hole 18 and the section 24' which extends between pulley 16 and anchor hole 18' is shortened due to the movement of the cable over pulleys 15 and 16, and around pulleys 13 and 14. As a consequence, the force applied to tailgate 20 by hooks 29 and 29', respectively, at cable anchor holes 18 and 18' causes the tailgate to swing upward about the hinges 34.

Figure 3:
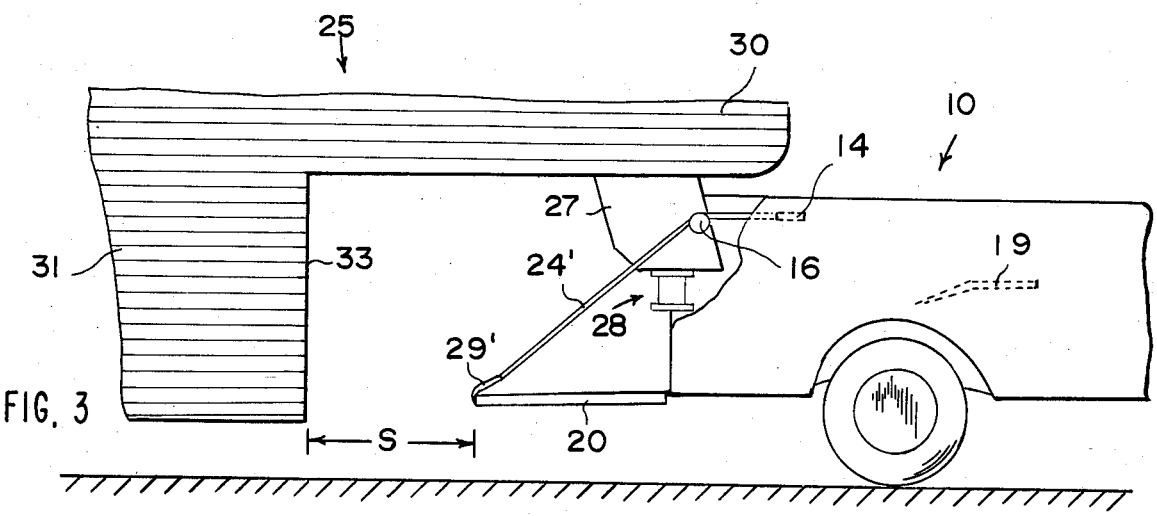

When coupling or decoupling of the Fifth Wheel Vehicle to the truck is not underway, the cable 17 is removed and stored in a convenient location. When it is desired to carry out the coupling process of the present invention, the cable hooks 29, 29' are inserted into the cable anchor holes 18, 18' and the cable is wrapped over pulleys 15, 16 and around pulleys 13, 14. The cable 17 may readily be slipped over these pulleys and attached to the tailgate 20. With the cable in place, the operator moves the pick-up truck to a position in front of the Fifth Wheel Vehicle 25 with the open bed of the pick-up truck facing the forward section 30 of the Fifth Wheel Vehicle 25. It is assumed that the mounting mechanism 19, the so-called "Fifth Wheel," is in fixed position attached to bed 22 of pick-up truck 10. As seen in FIG. 3, the forward portion 30 of Fifth Wheel Vehicle 25 does not reach down to the baseline of the main body 31 of the vehicle. Thus, pin 28 attached to the bottom of pin box 27 depends from forward section 30 and is intended to seat in the central opening of 32 of the Fifth Wheel mount 19, shown in FIGS. 1 and 2. The pin 28 on pin box 27 must clear the bed 22 of truck 10 but will not normally be able to clear the top of tailgate 20 when it is in a closed position. Therefore, it is necessary, as shown in FIG. 3, to back up truck 10 with the tailgate 20 in an open position. Initially, there is ample space, S, between the edge of tailgate 20 and the front wall 33 of the main body 31 of Fifth Wheel Vehicle 25. However, as truck 10 backs up, this space is reduced to the space S' of FIG. 4 and then to the space S" of FIG. 6. It is evident that the space S" is less than the height of tailgate 20. Thus, prior to the coupling of pin 28 in central opening 32 the tailgate 20 must be raised. The sequence of FIGS. 3-6 illustrates the utility of the mechanism of the present invention in automatically lifting the gate out of the space between the front wall 33 of the main body 31 of the Fifth Wheel Vehicle 25 and the rear of pick-up 10 as coupling is accomplished.

As shown in FIG. 3, the pin box 27 first crosses the position which tailgate 20 would occupy if it were closed. Once the pin box 27 clears this position, it is feasible to raise tailgate 20 to nearly a vertical position. Thus, in accordance with the process and mechanism of the present invention, pin box 27 next encounters the section 21 of cable 17, as shown in FIG. 4, and begins to draw the cable taut, thereby raising tailgate 20. Tailgate 20 continues to rise as the pick-up truck is backed underneath the forward section 30 of the Fifth Wheel Vehicle 25 and approaches wall 33. The operator remains in the cab and no second person is required to lift the tailgate. As shown in FIG. 5, the tailgate is lifted to a position, shown to be approximately 25 degrees from vertical by the time the pin box 27 approaches the position of the mounting mechanism 19. Meanwhile, the space between the edge of tailgate 20 of truck 10 and the front wall 33 of the main body of Fifth Wheel Vehicle 25 has diminished to a length, S', less than the full length of tailgate 20 yet great enough to allow tailgate 20 to project at the aforestated 25 degree angle. By the time the pin box 27 with attached pin 28 is coupled with the mounting mechanism 19, the tailgate 20 is raised to a nearly vertical position, shown in FIG. 6. The driver of the truck then brakes the truck, leaves the cab, removes the cable and finishes closing tailgate 20 on the back of the bed 22 of the truck 10. The space S" now remains between the tailgate 20 and the front wall 33 of Fifth Wheel Vehicle 25.

The decoupling procedure is carried out by reversing the steps set out above for coupling. The pulleys 13, 14 and 15, 16 are in place on the sides 11 and 12 of the truck 10. The latch holding the tailgate in a closed position on the truck body is unlatched. The section 21 of cable 17 is wrapped around the pin box 27 and the remainder of the cable 17 is threaded over the pulleys 13, 14 and 15, 16 and the cable is anchored in cable anchor holes 18, 18' as described previously so that the tailgate 20 is held in a nearly vertical position, approximating that shown in FIG. 6. Then, the driver enters the cab of the truck and begins to drive forward slowly. As the pin box 27 backs away from the Fifth Wheel mount 19, the weight of the tailgate pulls the cable over the pulleys 13, 14 and 15, 16 and along behind the moving pin box 27. As a consequence, the tailgate moves from a near vertical position to the horizontal position shown in FIGS. 4 and 3. It is evident that the force pulling the cable behind the moving pin box 27 will increase as the tailgate 20 rotates on its hinges 34 farther and farther away from the truck bed 22. When the pin box 27 has passed the position where the arc of the rotating tailgate 20 will clear the bottom of the box, then the truck may be stopped. The driver then dismounts the cab, removes the cable, manually closes the gate and drives the truck away. In decoupling as well as with coupling, the need to have a person standing adjacent the Fifth Wheel Vehicle 25 and the rotating tailgate 20 is avoided. With both procedures, accidents are virtually eliminated and only one person is required. And damage is avoided to both the tailgate and to the body of the Fifth Wheeler.

I claim:

1. A mechanism for lifting the tailgate of a truck used to tow a Fifth Wheel vehicle, said truck having a Fifth Wheel mount, comprising in combination:
   a Fifth Wheel Vehicle having a main body and a forward section, a pin box having a pin depending therefrom, said pin box being attached to the underside of said forward section of said Fifth Wheel Vehicle;
   a truck having a tailgate and an open bed on which is mounted a Fifth Wheel mount, said truck having its rear end adjacent said Fifth Wheel Vehicle so that said open bed of said truck is positioned underneath said forward section of said main body of said Fifth Wheel Vehicle;
   pulley means mounted on each side of said truck along an edge of said open bed, said pulley means being positioned between said Fifth Wheel mount and said tailgate;
   cable means, each end of which is attached to an end of said tailgate, said cable means extending between one of said ends of said tailgate to and around the adjacent one of said pulley means, across said open bed of said truck to and around the other one of said pulley means and to the other end of said tailgate;
   whereby as said truck is backed underneath said forward section of said Fifth Wheel Vehicle to engage said pin of said pin box of said Fifth Wheel Vehicle in said Fifth Wheel mount, said pin box engages said cable where it spans said open bed of said truck so that said tailgate is drawn toward a closed position as said pin box approaches said Fifth Wheel mount.

2. A mechanism for lifting the tailgate of a truck in accordance with claim 1 wherein said pulley means are oriented parallel to the bed of said truck to stabilize said cable in the lateral direction between the walls of said body.

3. A mechanism for lifting the tailgate of a truck in accordance with claim 2 wherein a second pulley means is provided on each side of said truck, said second pulley means being oriented parallel to the walls of said truck to stabilize the traverse of said cable in the vertical direction above the bed of said truck.

4. A mechanism for lifting the tailgate of a truck in accordance with claim 3 wherein said pulley means are located on the inside of the sides of said truck.

5. A method of coupling the pin of a Fifth Wheel Vehicle pin box to a Fifth Wheel mount on the bed of a truck, comprising the steps of:
   positioning a truck having an open bed and a tailgate with its rear end in opposition to the forward section of said Fifth Wheel Vehicle;
   opening said tailgate of said truck;
   connecting a first end of a cable to one end of said tailgate of said truck;
   arranging said cable through a pulley means attached to one side of said truck along an edge of said open bed, across said open bed of said truck to another pulley means mounted on the other side of said truck which extends along the opposing edge of said open bed;
   connecting a second end of said cable to the other end of said tailgate of said truck; and
   backing said truck towards said Fifth Wheel Vehicle so that a pin box which depends from said forward section of said Fifth Wheel Vehicle passes over said open tailgate of said truck and engages said cable where said cable spans said open bed of said truck;
   whereby said tailgate is pulled up towards a closed position as said pin engages and locks in said Fifth Wheel mount.

6. A method of coupling a Fifth Wheel Vehicle to the bed of a truck in accordance with claim 5 wherein said step of arranging said cable through a pulley on one side of said truck, across the open bed of said truck, and around a pulley on the other side of said truck is accomplished by the step of arranging said cable through a pulley on one side of said truck which is oriented parallel to the bed of said truck, across the open bed of said truck and around another pulley on the other side of said truck which is oriented parallel to the bed of said truck.

7. A method of coupling a Fifth Wheel Vehicle to the bed of a truck in accordance with claim 6 wherein after said step of arranging said cable, the following step is carried out:
   arranging said cable through a second pulley on said one side of said truck which is oriented parallel to said one side and around a second pulley on said other side of said truck which is oriented parallel to said other side of said truck.

* * * * *